US010979514B2

(12) United States Patent
Yu et al.

(10) Patent No.: US 10,979,514 B2
(45) Date of Patent: Apr. 13, 2021

(54) FLEXIBLE MESSAGE TRANSFORMATION AND DELIVERY

(71) Applicant: INTERNATIONAL BUSINESS MACHINES CORPORATION, Armonk, NY (US)

(72) Inventors: Chao Yu, Ningbo (CN); JinRong Zhao, Ningbo (CN); De Shou Kong, Beijing (CN); Xiao Bing Liu, Beijing (CN); Xin Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 85 days.

(21) Appl. No.: 16/207,451

(22) Filed: Dec. 3, 2018

(65) Prior Publication Data

US 2020/0177684 A1   Jun. 4, 2020

(51) Int. Cl.
*G06F 15/16* (2006.01)
*H04L 29/08* (2006.01)
(Continued)

(52) U.S. Cl.
CPC ............ *H04L 67/16* (2013.01); *G06F 9/4881* (2013.01); *G06F 9/546* (2013.01); *H04L 45/02* (2013.01); *H04L 63/08* (2013.01)

(58) Field of Classification Search
CPC . H04L 67/16; H04L 67/1097; H04L 67/2842; H04L 65/403
See application file for complete search history.

(56) References Cited

U.S. PATENT DOCUMENTS 7,836,493 B2   11/2010   Xia et al.
8,189,468 B2    5/2012   Bugenhagen
(Continued)

FOREIGN PATENT DOCUMENTS

CN      102710749 B      4/2015
CN      103312624 B      3/2016
WO    2005109798A2 A2   11/2005

OTHER PUBLICATIONS

Mell, Peter, et al., "The NIST Definition of Cloud Computing", NIST Special Publication 800-145, Sep. 2011, Gaithersburg, MD, 7 pgs.

*Primary Examiner* — Yves Dalencourt
(74) *Attorney, Agent, or Firm* — Michael O'Keefe; Matthew M. Hulihan; Heslin Rothenberg Farley & Mesiti P.C.

(57) ABSTRACT

Flexible message transformation and delivery includes authenticating a message consumer for access to messages of a publisher, receiving from the consumer a service topology label identifying a service topology of a service of which the message consumer is a part, where the service topology label is used in controlling provision of messages to members of the service topology, identifying an authority label for the consumer, the authority label being associated with transformation(s) to apply to messages, and based on obtaining a message from the publisher for publishing to consumers that are members of the service topology: determining that the consumer is a member of the service topology, identifying the transformation(s) based on the identified authority label for the consumer; applying to the message the transformation(s) to obtain a transformed message, and providing the transformed message to the consumer.

20 Claims, 6 Drawing Sheets

(51) Int. Cl.
  *H04L 29/06* (2006.01)
  *G06F 9/54* (2006.01)
  *G06F 9/48* (2006.01)
  *H04L 12/751* (2013.01)

(56) References Cited

U.S. PATENT DOCUMENTS

| | | |
|---|---|---|
| 9,471,534 B2 | 10/2016 | Gao et al. |
| 2012/0179752 A1* | 7/2012 | Mosley ............... G06F 16/951 709/204 |
| 2017/0069009 A1* | 3/2017 | Bursey ............... G06Q 10/0633 |
| 2017/0346915 A1* | 11/2017 | Gay ................... H04L 67/2842 |

* cited by examiner

FLEXIBLE MESSAGE TRANSFORMATION AND DELIVERY

BACKGROUND

Messaging systems are widely used in various fields such as cloud computing, and, in particular, Infrastructure as a Service (IaaS) frameworks and micro-services. Advanced Message Queuing Protocol (AMQP) is a message-oriented middleware (MOM) application layer protocol that is based on message brokering between message providers and clients without limitations on the specific product or language used. There are a large number of open source implementations of AMQP.

SUMMARY

Shortcomings of the prior art are overcome and additional advantages are provided through the provision of a computer-implemented method. The method authenticates, in a message-oriented middleware environment, a message consumer for access to messages of a publisher. The method receives from the message consumer a service topology label identifying a service topology of a service of which the message consumer is a part. The message consumer is a member of the service topology, the service topology label is used in controlling provision of messages to members of the service topology. The method identifies an authority label for the message consumer. The authority label is associated with transformation(s) to apply to messages sent by the publisher. Based on obtaining a message from the publisher for publishing to message consumers that are members of the service topology, the method determines that the message consumer is a member of the service topology. The method also identifies the transformation(s) based on the identified authority label for the message consumer. Additionally, the method applies to the message the transformation(s) to obtain a transformed message, and provides the transformed message to the message consumer.

Further, a computer system is provided that includes a memory and a processor in communication with the memory, wherein the computer system is configured to perform a method. The method authenticates, in a message-oriented middleware environment, a message consumer for access to messages of a publisher. The method receives from the message consumer a service topology label identifying a service topology of a service of which the message consumer is a part. The message consumer is a member of the service topology, the service topology label is used in controlling provision of messages to members of the service topology. The method identifies an authority label for the message consumer. The authority label is associated with transformation(s) to apply to messages sent by the publisher. Based on obtaining a message from the publisher for publishing to message consumers that are members of the service topology, the method determines that the message consumer is a member of the service topology. The method also identifies the transformation(s) based on the identified authority label for the message consumer. Additionally, the method applies to the message the transformation(s) to obtain a transformed message, and provides the transformed message to the message consumer.

Yet further, a computer program product including a computer readable storage medium readable by a processing circuit and storing instructions for execution by the processing circuit is provided for performing a method. The method authenticates, in a message-oriented middleware environment, a message consumer for access to messages of a publisher. The method receives from the message consumer a service topology label identifying a service topology of a service of which the message consumer is a part. The message consumer is a member of the service topology, the service topology label is used in controlling provision of messages to members of the service topology. The method identifies an authority label for the message consumer. The authority label is associated with transformation(s) to apply to messages sent by the publisher. Based on obtaining a message from the publisher for publishing to message consumers that are members of the service topology, the method determines that the message consumer is a member of the service topology. The method also identifies the transformation(s) based on the identified authority label for the message consumer. Additionally, the method applies to the message the transformation(s) to obtain a transformed message, and provides the transformed message to the message consumer.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
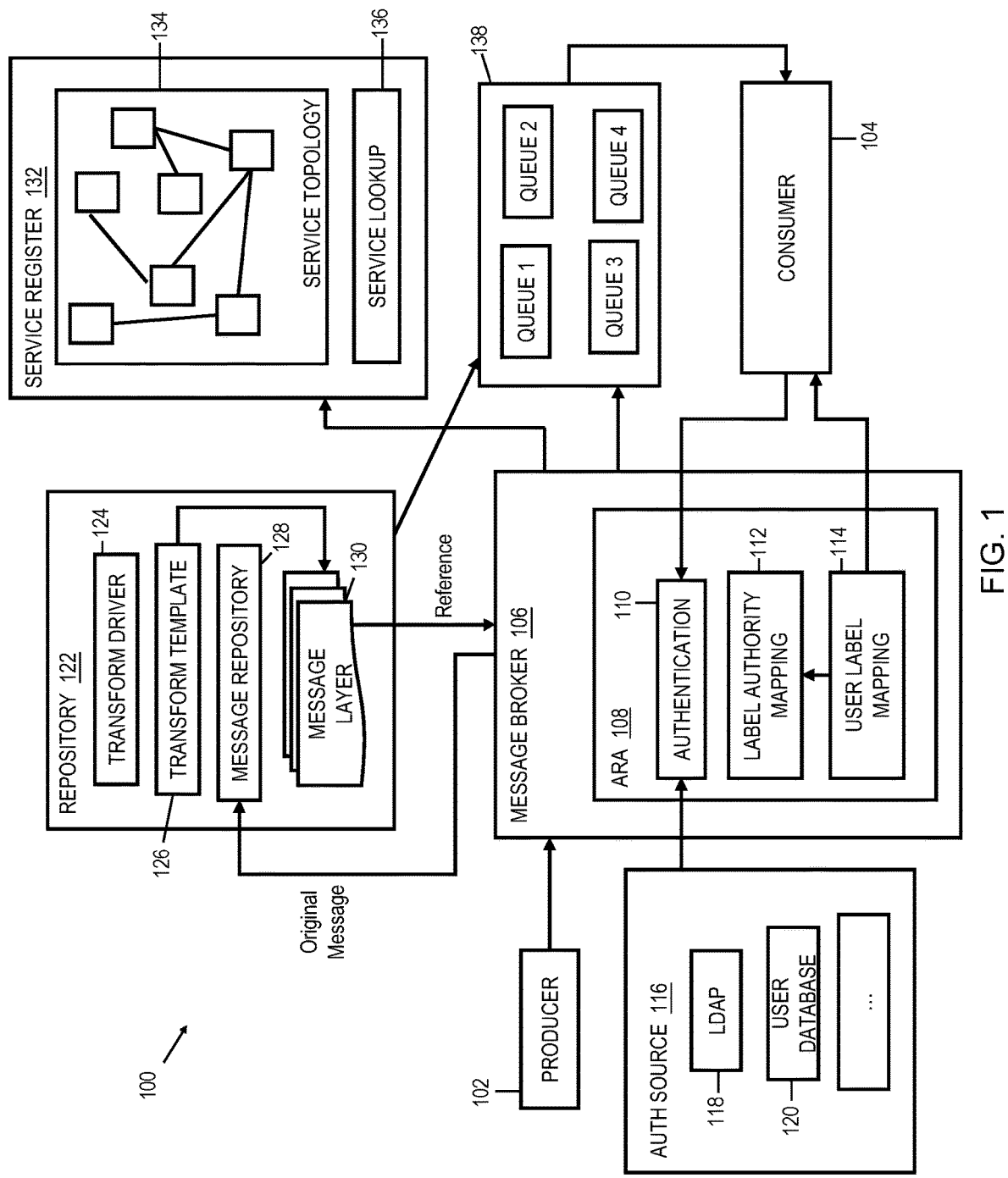
FIG. 1 depicts an example messaging environment to incorporate and use aspects described herein.

Current message broker offerings, such as AMPQ, lack flexibility and sophistication for authentication, authorization, and message transformations, for instance message masking, highlighting, encryption, decryption, and other message transformations. Current authorization mechanisms fail to support the concept of time-based authorization, which can cause confusion and lack of control in application message delivery. Additionally, current publish/subscribe or topic-based offerings fail to offer robust control over user authorization. Once a subscriber subscribes with the message broker, the subscribed message(s) can be accessed by the client. However, in practical situations involving product applications or other service offerings, it may be desired to control authorization over message broadcasting and access. Furthermore, even when a user leaves or is to have access revoked, the authority remains and operations can still be performed using the user's account.

Described herein are approaches for flexible authorization for message propagation, e.g. in cloud service components and micro-services communication, for instance. The messaging may be based on any desired messaging protocol. Examples presented herein are discussed in the context of classical Advanced Message Queuing Protocol (AMQP) protocol only by way of example.

In traditional AMQP, when the consumer authenticates successfully, it has full authority to receive and view the delivered messages to which it subscribed. This may be undesirable in production environments. In contrast, aspects described herein operate on the delivered message(s) using transform function template(s), providing the ability to apply message transformations, such as encryption, highlighting, masking, and simplification, as examples.

Encryption could be used for security reasons. The message broker can selectively encrypt all or portion(s) of a message. When the consumer receives the message, it can decrypt the message on its end, assuming it has the decryption key. Alternatively, the message can be decrypted on behalf of the consumer, for instance by way of another transformation applied to the encrypted message prior to message delivery to the consumer. Thus, in some examples, a transformation is a decryption operation performed by the message broker to decrypt message content for the consumer before delivery. If that consumer has no right to view encrypted portions of the message, then the decryption transformation can be unavailable to the consumer. Selective decryption can be available depending on the permissions afforded to the different consumers, as explained herein.

Highlight is another example transformation. Sometimes consumers focus on particular information in messages, for instance information that the consumer deems most important. Message highlight can highlight this information in a message, enabling the consumer to retrieve only highlighted parts of the message. The message broker can perform the highlight transformation, which may be defined by the broker and/or with input from the consumer.

Mask is another example transformation, in which information can be masked/hidden from the consumer, either at the consumer's request or based on limitations on the access that the consumer is to have to message content.

Simplification is yet another example transformation and provides a way to simplify features of the messages, for instance to remove some fields or other content of the message.

Transformations can be defined by template transform functions as explained herein. Each template function can be associated with a respective layer of transformation to be applied to a target message. Applying transformations to the message can apply each layer of transformation to the message to obtain a transformed message to be delivered to the message consumer. Template transform functions can be wrapped into an authority for a consumer, as detailed herein.

In a traditional authority setting of AMQP, authorities are tied to a specific user that is fixed and inflexible. In contrast, aspects herein present a label mechanism that is flexible and easy to manage. Service components (e.g. message consumers) of an application or service can be registered into a service register module, either in advance or at the time of a message consume process. Once labels are attached to a component, the component's authority and available transformations are confirmed without manual configuration. Service components of a service/application are registered to a given service topology with an associated service topology label that the component can present to identify the component to the proper service topology. The authority label for a component is associated with the transformation(s) available for that consumer. With the labeling approach described herein, a service topology graph can be dynamically refreshed to refresh the authorities for a given component/consumer (entity, database, user, etc.). The component may initially be acting as database with an authority label of 'xxxx.database', associated with decryption and highlight authorities, i.e. the template transform functions associated with that label. After some time, this role of the component may change to that of a web container for which a different authority label, 'xxxx.webcontainer', applies. Given the change in role of the consumer, the consumer's authority can change, i.e. decryption and highlight authorities may be stripped automatically and changed to only a simplification authority associated with a simplification transformation. The foregoing is an example where an authority label for a consumer may change from a first label to a second label to correspond to an update in the authority that the consumer is to have for a given subscription. In further aspects, a time expiration can be attached to certain authorizations to enable consumer authorizations to be revoked after expiry of a time period.

The traditional AMQP publish/subscribe mechanism allows any consumer to fetch a message as long as the consumer can reach the message queue. However, in real production environments, it may be desired for only services (also referred to service components herein, which are example message consumers) in/of a same application (also referred to herein as 'service') to subscribe to these messages, while preventing outside components, e.g. components of other services/applications, from reaching the queues. A service topology label is presented herein, in which components in a same namespace are identified with a service topology label. Those components can subscribe to messages from each other, while components outside of the namespace cannot. When a component of one namespace desires to subscribe to messages from publishers in a different namespace, the component is to have a same service topology label as those components of the different namespace. As noted, this label can be made time sensitive, meaning that the service topology label may, after a duration of time, be rendered ineffective at establishing membership of the consumer in the service topology. This is the case regardless of whether the consumer remains an actual member of the topology; the service topology label, if expired, will be ineffective at establishing the membership unless and until the service topology and/or the label is refreshed. This expiration can be used to control ongoing provision of different messages to members of the service topology.

FIG. 1 depicts an example messaging environment 100 to incorporate and use aspects described herein. The environment is a message-oriented middleware environment in some examples. The environment can be implemented on one or more computer systems, for instance several servers that communicate over one or more communications networks.

Environment 100 includes a producer 102 of messages and a consumer 104 of those messages. Producer 102 produces messages and provides them to message broker 106. Consumer 104 authenticates with message broker 106 to receive messages. This authentication is assisted by an authorization component 108, which includes an authentication component 110 that interacts with an authorization source 116, in this example a LDAP registry 118, user database 120, or the like. Message broker 106 interacts with a repository 122 that stores messages and includes facilities for message transformation. Message broker also interacts with service register 132 to confirm service topology 134 membership as described herein. For authorized message delivery, the repository delivers transformed messages to queues 138 for delivery to the consumers, such as consumer 104. Various components of FIG. 1 are described in further detail herein.

As noted, message consumer 104 of messaging environment 100 is authenticated for access to messages of the publisher 102. The message consumer 104 is a service component, for instance, such as one operating on behalf of a user (an LDAP user in this example). The service component is a component of a service or application, which are used interchangeably herein.

For flexible authentication and authorization as described herein, the consumer is to be to be authenticated using credentials, e.g. a user/password, by authentication source 116 via an LDAP registry 118, user database 120, or other facility. After successfully authenticating, a label list of one or more authority labels is delivered for consumer 104 from user label mapping component 114. An authority label is a symbol or role of the consumer. A consumer may have zero or more roles/authorities and a corresponding zero of more authority labels. An authority label describes or indicates at least one transformation collection. Each transformation collection is associated to a role with a role name. As an example, one role might indicate highlight and encryption transformations, while another role might indicate highlight and mask transformations. The combined roles include highlight, mask, and encryption transformations. The message broker 106, with knowledge of the label authority mapping 112 labels for each consumer, can confirm authorities.

The message broker 106 delivers service topology labels to the service register 132 for indicating service topology. Service and components thereof (e.g. consumers) providing a same service topology label are indicated to be in a same topology, enabling them to communicate with each other via messaging. Such messaging can include message redirecting and forwarding. The service register 132 is used by the message broker 106 in part to confirm that the consumer is in the service topology and ascertain whether a service topology label provided by a customer has expired.

Queues 138 deliver to consumers messages transformed according to template transform functions. After a message is delivered to the broker 106 by the publisher 102, the broker 106 provides the message to message repository 128 of repository 122. Repository 122 has a function of transforming messages for consumers. The original message is stored at least temporarily. When delivery to a consumer is to be made, one or more transformations are applied based on transform template functions and placed in queue. The original message may be cached in the message repository 128 or flushed at that point.

The transform driver 124 of repository 122 can provide a plugin mechanism for a rich transformation template repository. For instance, the driver 124 provides interface(s), such as API calls, for transformations provided by outside component(s).

Figure 2:
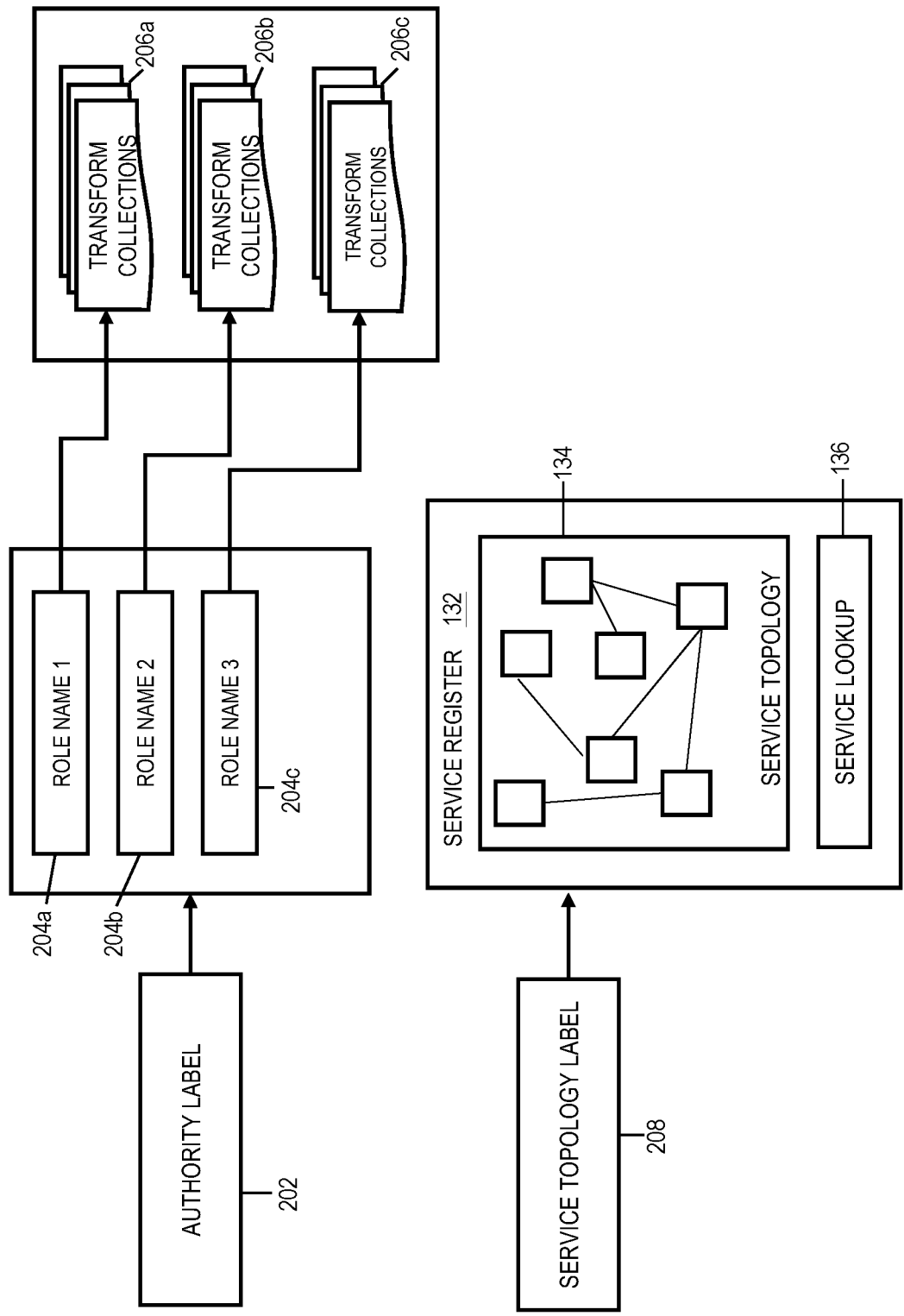
FIG. 2 depicts an example conceptual representation of authority and service topology labels, in accordance with aspects described herein.

Further details of authority and service topology labels are provided with reference to FIG. 2, depicting an example conceptual representation of authority and service topology labels, in accordance with aspects described herein.

An authority label 202 is determined by the message broker as a collection of roles (204*a*, . . . , 204*c*). Each role 'owns' some transformation collection (206*a*, . . . , 206*c*) to apply to messages. In particular examples, the role is analogous to roles in classical database configuration assistance, such as database admin, web application, cache service, etc. Transformation can be a function model, transforming the message with some template pattern to extract/produce desired useful information. Thus, an authority label describes or indicates at least one transformation collection. A consumer that authenticates has associated authority label describing the consumer's role(s). For a given message that a consumer is to receive, the transformation(s), if any, applied to that message before delivery to the consumer are dictated by the authority label for the message consumer.

A service topology label is different from the authority label and is determined/indicated by the consumer itself. The service topology label is an indication of the consumer service, indicating how the consumer fits into the overall application/service/topology. An example service topology label might appear as 'xxx-service.production.component' or 'xxx-service.staging.component, as examples. The service register 132 caches service topology graphs (shown is one such graph 134) for fast service lookup 136 of services in a common topology. The service topology graph captures the organization of the service.

The consumer delivers the service topology label to the broker, for instance when the consumer authenticates with the broker. The label is presented to the service register to identify other components with which the consumer can communicate. This allows separation in the communication groups—for instance to prevent a service in a test environment from communicating with services in the production environment. In some embodiments, the service topology label controls forwardability of messages, whereby consumers are unable to forward received messages from one service topology to a different service topology.

Referring to FIG. 1, the message broker 106 receives an original message from producer 102 and delivers the original message provided by the producer to the message repository 128. In conventional practice, the message broker instead delivers the original message to a queue for sending to recipient consumers. However, in accordance with aspects described herein, a message transformation layering approach is provided.

For security, some key parameters of the original message could be encrypted using a transform template pattern, if desired. In certain situations, it may be desired to automatically encrypt some or all information of an original message.

Template transform functions provide a way to transform messages using a layering approach. Each transform function may be considered a new layer to the original message. The transformations may be layered and overlaid on a message without initially applying any changes to the underlying message. When the message is to be composed and queued for delivery to a particular consumer/consumer group, the message broker 106 can call out to the repository 122 to take an original message and transform it according to particular transform function(s) for a given consumer/group by applying the applicable layer(s) of transformation(s) to the original message and output a transformed message. That transformed message can then be sent down to the message broker and/or delivered directly to one of the queues for delivery. In some embodiments, the message broker caches only message layer references passed from the message layer 130 of the repository, rather than the original or transformed messages themselves. In the example of FIG. 1, when the message broker delivers a message to a queue, a reference or other indication is provided for the repository 112 to deliver the transformed message into a particular queue for delivery.

The layering approach avoids having to store and maintain several different transformed variants of a single original message; instead, references or descriptions of a particular set of transformations can be stored to define how to dynamically construct a specific transformed message for sending. Since the message broker 106 in some embodiments caches only a message layer reference, rather than the transformed message itself, then the reference can be discarded after the message is consumed by the consumer. The message layer information can remain stored in message repository 128, for instance to facilitate later message forwarding.

Further details of the service topology mechanism are now provided. The message broker 106 receives from the message consumer 104 a service topology label identifying a service topology of a service of which the message consumer is a part. As noted, consumers may be grouped into common namespaces by way of their service topology labels, such that only consumers in the same namespace may be allowed to subscribe to each other's messages. Initially, the label provision by the consumer could be provided as part of a registration process for the message broker 106 to register the consumer 104 and its service topology label to the service register 132. The service register can refresh the service topology 134 and ensure that that the consumer is identified in that appropriate topology map/graph. In some examples, the graph is authoritative and the service register can return an indication whether the consumer is identified in the current service topology map and/or whether the label is expired. Thus, if the consumer delivering the service topology label is not already indicated in the graph, or the label has expired, then this can be so indicated by the service register to the message broker. The registration may be performed as an initial matter, before the consumer is set to receive messages.

Since service topology labels may be made time sensitive, they can function to further control provision of messages to members of the service topology by preventing delivery to consumers, even if they legitimately remain members, if the label is expired. In other words, expiry of the label renders the label ineffective at establishing membership of the consumer in the topology, regardless of whether the consumer is no longer part of the topology. The topology can be periodically flushed and refreshed by controlling label expiration of the consumers. The message broker can control label expiration times, and these can be set and configured by any desired entity, for instance an administrator. When the message broker reaches out to the service topology, the broker can receive an indication as to whether the label is expired. In some examples, the label is assumed to be unexpired unless the service register indicates otherwise, and the service register indicates to the broker whenever a presented label is expired.

In particular examples, a data structure indicates namespaces and, for each namespace, a topology label an expiry time. The label is the same for consumers in the namespace using the same service topology label, and therefore their subscription would expire at same time as each other. An example namespace is the name of the application, and an example label is the component type or role within that application. Publishers can publish to particular namespace(s), and optionally to particular labels within a namespace.

Accordingly, aspects described herein present facilities for messaging, for instance message-oriented middleware and associated processing thereof. Flexible authentication, authorization, and transformation is provided that includes determining consumer authorities using an authority label approach to control transformation of messages by way of, e.g., encryption, decryption, highlight, mask, and simplification. A message layer approach is provided by treating message transformations as a collection of layered transformations, with each layer being a different transformation, and where the transformations are selectively and dynamically applicable to original messages when transformed variants thereof are to be queued for delivery to consumers. Additionally provided is a service topology approach that determines service topology with a service label to control message delivery by confining message passing to given namespaces, and enforces time-based authority between different namespace components for message delivery.

Figure 3:
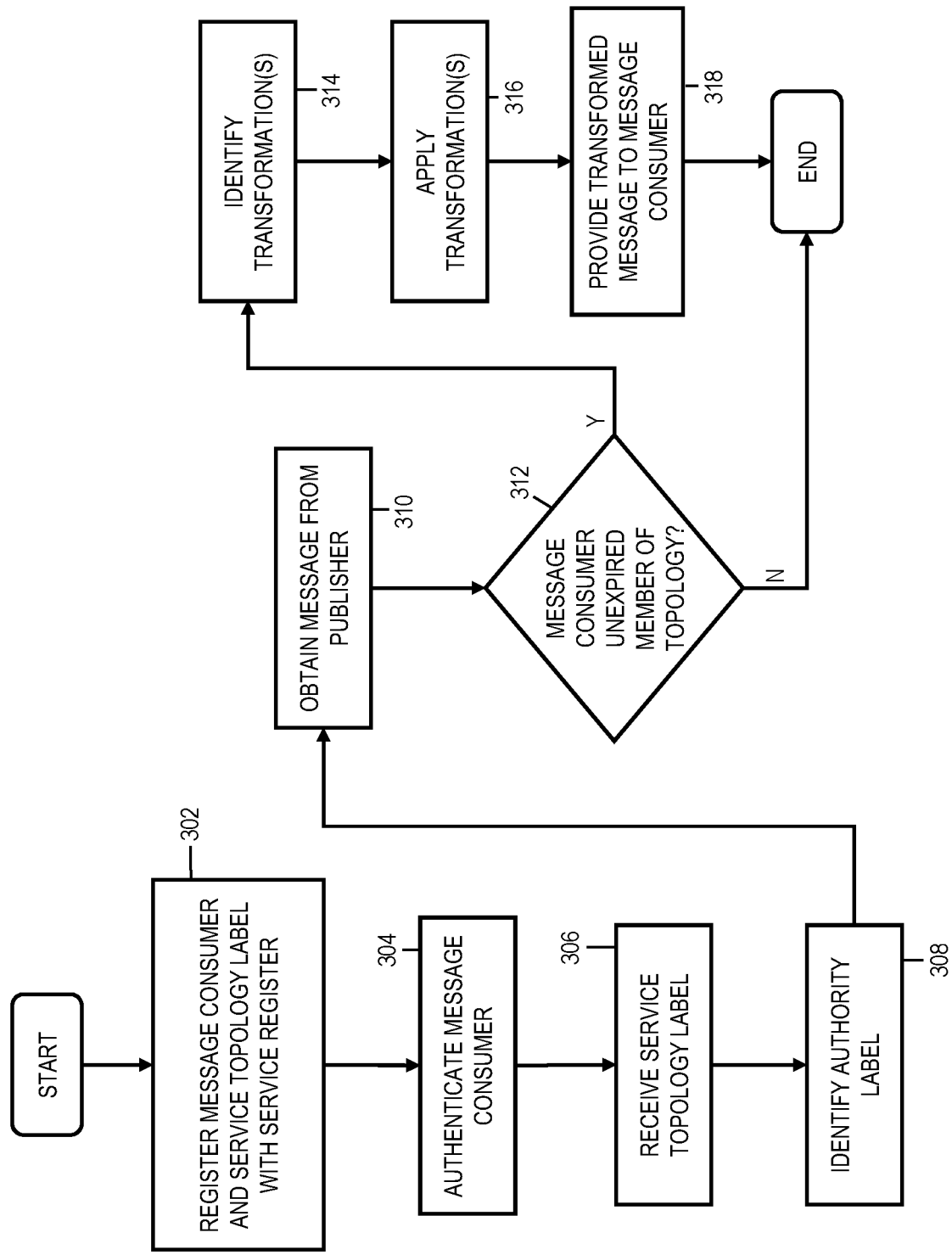
FIG. 3 depicts an example process for flexible message transformation and delivery, in accordance with aspects described herein.

FIG. 3 depicts an example process for flexible message transformation and delivery, in accordance with aspects described herein. In some examples, the process is performed by one or more computer systems, such as those described herein, which may include one or more computer systems of a message-oriented middleware (MOM) environment, for instance a message broker computer system and/or one or more other computer systems in communication therewith.

The process includes registering (302), in a message-oriented middleware environment, a message consumer and service topology label with a service register that maintains a current service topology map of a service topology of a service. The message consumer is or includes a service component of the service, for instance. Typically, though not always, the consumer is a software program or process operating on behalf of a user, such as an LDAP-registered user. The registration can serve as a registration for the consumer to receive messages.

The process continues with authenticating (304), in the message-oriented middleware environment, the message consumer for access to messages of a publisher. The process receives (306) from the message consumer the service topology label, e.g. which was previously provided as part of the registering, which identifies the service topology of the service of which the message consumer is a part. The service topology label is used in controlling provision of messages to members of the service topology. The service topology label can indicate a namespace associated with a group of message consumers, of the service topology, permitted to exchange messages with each other.

In some examples, the service topology label has associated therewith a time-based expiration after which the service topology label is ineffective at establishing membership of the message consumer in the service topology.

With the receive service topology label, the message broker can verify that the consumer is allowed to receive messages within that service topology. For instance, the broker can provide the received service topology label to a service register and receive, in response, an indication from the service register that the message consumer is identified in a current service topology map and that the service topology label is not expired.

The process of FIG. 3 continues by identifying (308) an authority label for the message consumer. The authority label is associated with transformation(s) to apply to messages sent by the publisher. The transformation(s) that are associated with the authority label are dictated by a collection of template transform function(s). Each template function of the template transform functions can be associated with a respective layer of transformation to be applied to a target message. Example transformations include, but are not limited to, selective encryption of message content, selective decryption of message content, selective highlighting of message content, selective masking of message content, and selective simplification of message content.

The process obtains (310) a message from a publisher, for instance a message for publishing to message consumers that are members of the service topology. Based on obtaining the message, the process determines (312) whether the message consumer is an unexpired member of the service topology. This is to confirm unexpired membership of the consumer in the topology. This can be based on the indication received from the service register after providing the service topology label to the service register. If not (312, N), the process ends and the message is not delivered, either as is or transformed, to the consumer. Thus, if the consumer is not a member of the topology and/or the label is expired, it is determined that the message consumer is not established as an unexpired member of the service topology, and therefore determined not to provide the message to the message consumer. If it is determined that the service topology label from the message consumer has expired, it is determined based thereon that that the message consumer is not established as being a member of the service topology. Based on that determination, it is determined not to provide the message to the message consumer.

Otherwise (312, Y), the process continues by identifying (314) the transformation(s) based on the identified authority label for the message consumer. The transforms to apply to this the obtained message depend on what the authority label is for that consumer. The process then applies (316) to the message the transformation (s_to obtain a transformed message. Applying the transformation(s) to the message to obtain the transformed message can apply each layer of transformation to the message. The transformation(s) can be identified by a reference that is maintained and delivered to a message queue to queue the message for sending to the message consumer. The applying the transformation(s) can use the reference to identify and apply the transformation(s) for providing the transformed message to the message consumer.

In some examples, transforming a message includes calling out to a service to apply a transformation. The applying the transformation(s) can therefore include leveraging a transform driver to call to an external transformation service to perform at least one transformation of the transformation(s), where the transform driver provides a transformation template repository with template transformations of which the call to the external transformation service is a part. The driver can provide several options for transformations, one or more of which can include calls to external providers.

After applying the transformations and obtaining the transformed message, the process provides (318) the transformed message to the message consumer.

Although various examples are provided, variations are possible without departing from a spirit of the claimed aspects.

Figure 4:
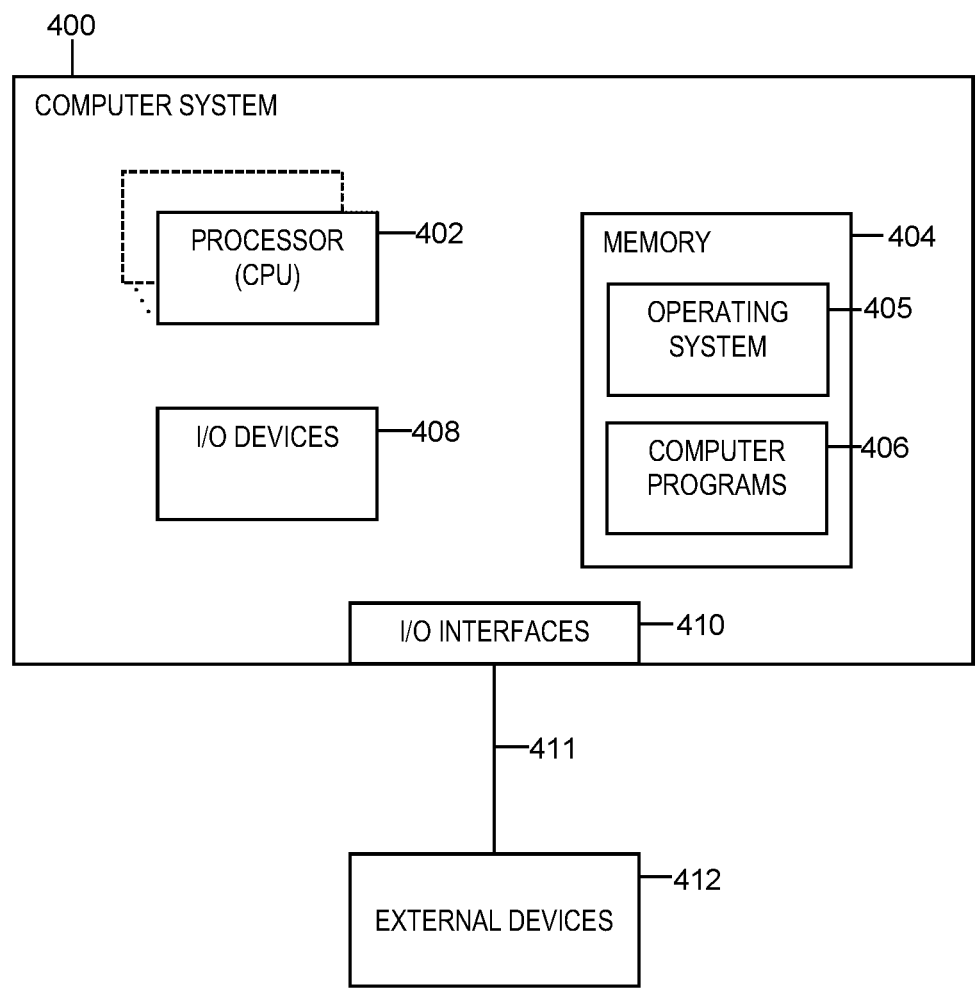
FIG. 4 depicts one example of a computer system and associated devices to incorporate and/or use aspects described herein.

Processes described herein may be performed singly or collectively by one or more computer systems, such as one or more servers of a message-oriented middleware environment. FIG. 4 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 4 shows a computer system 400 in communication with external device(s) 412. Computer system 400 includes one or more processor(s) 402, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 402 can also include register(s) to be used by one or more of the functional components. Computer system 400 also includes memory 404, input/output (I/O) devices 408, and I/O interfaces 410, which may be coupled to processor(s) 402 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 404 can be or include main or system memory (e.g. Random Access Memory) used in the execution of program instructions, storage device(s) such as hard drive(s), flash media, or optical media as examples, and/or cache memory, as examples. Memory 404 can include, for instance, a cache, such as a shared cache, which may be coupled to local caches (examples include L1 cache, L2 cache, etc.) of processor(s) 402. Additionally, memory 404 may be or include at least one computer program product having a set (e.g., at least one) of program modules, instructions, code or the like that is/are configured to carry out functions of embodiments described herein when executed by one or more processors.

Memory 404 can store an operating system 405 and other computer programs 406, such as one or more computer programs/applications that execute to perform aspects described herein. Specifically, programs/applications can include computer readable program instructions that may be configured to carry out functions of embodiments of aspects described herein.

Examples of I/O devices 408 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (412) coupled to the computer system through one or more I/O interfaces 410.

Computer system 400 may communicate with one or more external devices 412 via one or more I/O interfaces 410. Example external devices include a keyboard, a pointing device, a display, and/or any other devices that enable a user to interact with computer system 400. Other example external devices include any device that enables computer system 400 to communicate with one or more other computing systems or peripheral devices such as a printer. A network interface/adapter is an example I/O interface that enables computer system 400 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 410 and external devices 412 can occur across wired and/or wireless communications link(s) 411, such as Ethernet-based wired or wireless connections. Example wireless connections include cellular, Wi-Fi, Bluetooth®, proximity-based, near-field, or other types of wireless connections. More generally, communications link(s) 411 may be any appropriate wireless and/or wired communication link(s) for communicating data.

Particular external device(s) 412 may include one or more data storage devices, which may store one or more programs, one or more computer readable program instructions, and/or data, etc. Computer system 400 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 400 may be operational with numerous other general purpose or special purpose computing system environments or configurations. Computer system 400 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
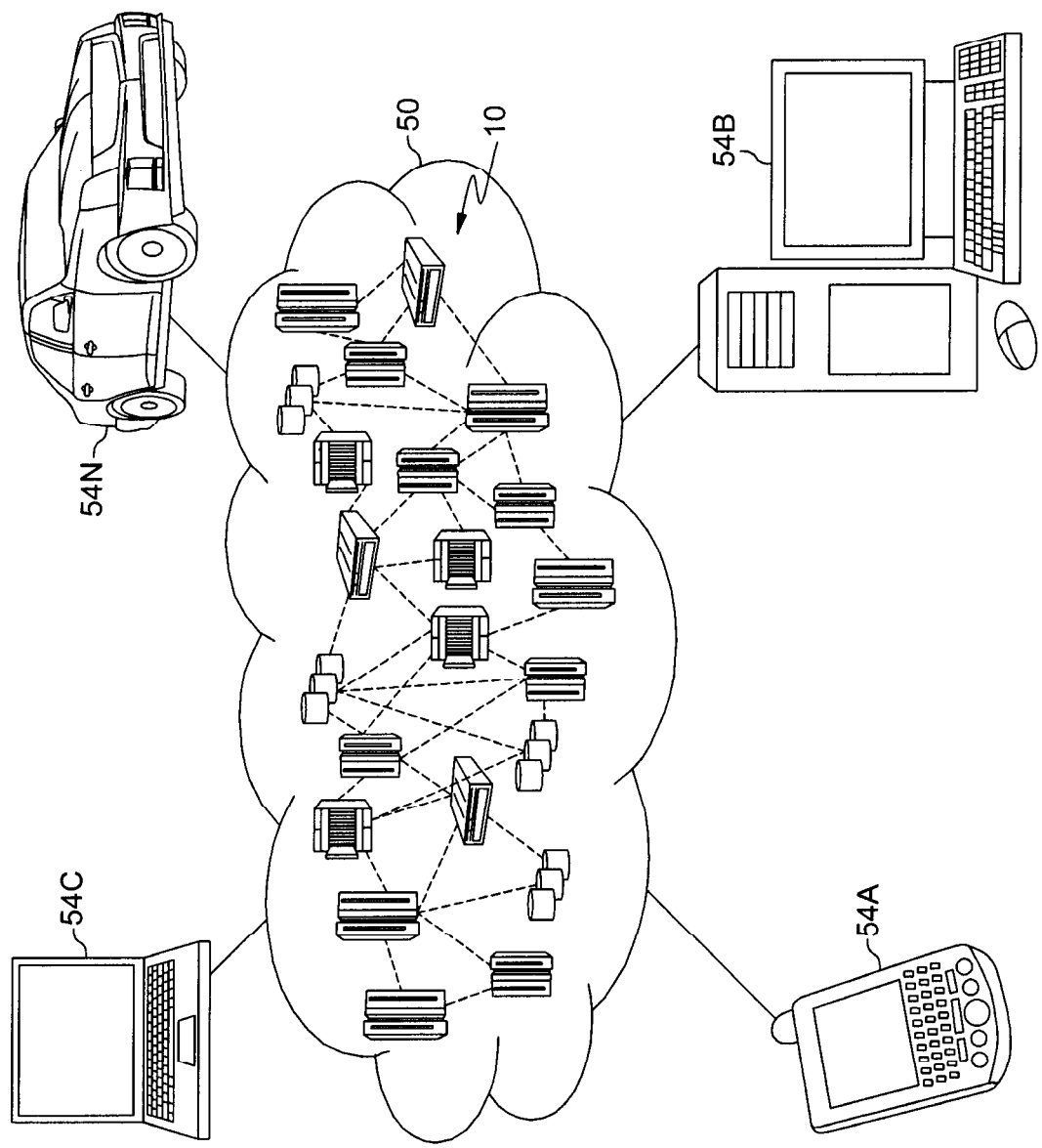
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
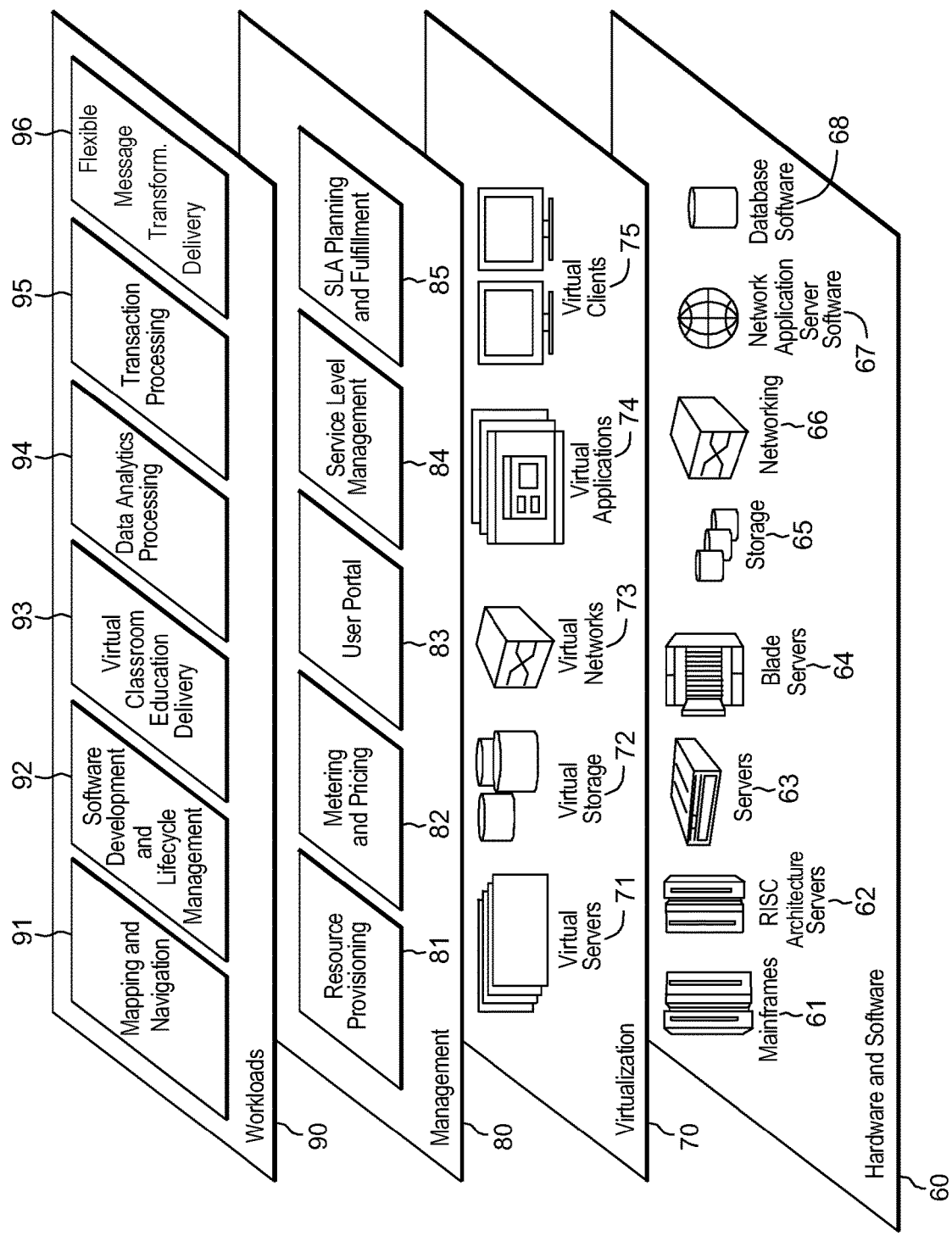
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and message transformation and delivery 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
authenticating, in a message-oriented middleware environment, a message consumer for access to messages of a publisher;
receiving from the message consumer a service topology label identifying a service topology of a service of which the message consumer is a part, wherein the message consumer is a member of the service topology, and wherein the service topology label is used in controlling provision of messages to members of the service topology;
identifying an authority label for the message consumer, the authority label being associated with one or more transformations to apply to messages sent by the publisher; and
based on obtaining a message from the publisher for publishing to message consumers that are members of the service topology:
determining that the message consumer is a member of the service topology;
identifying the one or more transformations based on the identified authority label for the message consumer;
applying, to the message from the publisher, the one or more transformations to obtain a transformed message, wherein the message from the publisher is an original message and wherein the transformed message is a variant of the original message and is transformed from the original message by the applying the one or more transformations; and
providing the transformed message to the message consumer.

2. The method of claim 1, wherein the service topology label has associated therewith a time-based expiration after which the service topology label is ineffective at establishing membership of the message consumer in the service topology.

3. The method of claim 2, further comprising, based on obtaining another message from the publisher for publishing to message consumers that are members of the service topology:
determining that the service topology label from the message consumer has expired;
determining, based on the determination that the service topology label has expired, that the message consumer is not established as being a member of the service topology; and
determining, based on the determination that the message consumer is not established as a member of the service topology, not to provide the another message to the message consumer.

4. The method of claim 1, wherein the one or more transformations associated with the authority label are dictated by a collection of one or more template transform functions, each template function of the one or more template transform functions being associated with a respective layer of transformation to be applied to a target message, and wherein the applying the one or more transformations to the message to obtain the transformed message applies each layer of transformation to the message.

5. The method of claim 4, wherein the one or more transformations are identified by a reference that is maintained and delivered to a message queue to queue the message for sending to the message consumer, wherein the applying the one or more transformations uses the reference to identify and apply the one or more transformations for the providing the transformed message to the message consumer.

6. The method of claim 1, further comprising registering the message consumer and the service topology label with a service register that maintains a current service topology map of the service topology.

7. The method of claim 6, wherein the method further comprises providing the received service topology label to the service register and receiving, in response, an indication from the service register that the message consumer is identified in the current service topology map and that the service topology label is not expired, wherein the determining that the message consumer is included in the service topology is based on the indication from the service register.

8. The method of claim 1, wherein the message consumer comprises a service component of the service.

9. The method of claim 1, wherein the service topology label indicates a namespace associated with a group of message consumers, of the service topology, permitted to exchange messages with each other.

10. The method of claim 1, wherein the applying the one of more transformations comprises leveraging a transform driver to call to an external transformation service to perform at least one transformation of the one or more transformations, wherein the transform driver provides a transformation template repository with template transformations of which the call to the external transformation service is a part.

11. The method of claim 1, wherein at least one transformation of the one or more transformations is selected from the group consisting of: (i) selective encryption of message content, (ii) selective decryption of message content, (iii) selective highlighting of message content, (iv) selective masking of message content, and (v) selective simplification of message content.

12. A computer system comprising:
a memory; and
a processor in communication with the memory, wherein the computer system is configured to perform a method comprising:
authenticating, in a message-oriented middleware environment, a message consumer for access to messages of a publisher;
receiving from the message consumer a service topology label identifying a service topology of a service of which the message consumer is a part, wherein the message consumer is a member of the service topology, and wherein the service topology label is used in controlling provision of messages to members of the service topology;
identifying an authority label for the message consumer, the authority label being associated with one or more transformations to apply to messages sent by the publisher; and
based on obtaining a message from the publisher for publishing to message consumers that are members of the service topology:
determining that the message consumer is a member of the service topology;
identifying the one or more transformations based on the identified authority label for the message consumer;
applying, to the message from the publisher, the one or more transformations to obtain a transformed message, wherein the message from the publisher is an original message and wherein the transformed message is a variant of the original message and is transformed from the original message by the applying the one or more transformations; and providing the transformed message to the message consumer.

13. The computer system of claim 12, wherein the service topology label has associated therewith a time-based expiration after which the service topology label is ineffective at establishing membership of the message consumer in the service topology.

14. The computer system of claim 12, wherein the one or more transformations associated with the authority label are dictated by a collection of one or more template transform functions, each template function of the one or more template transform functions being associated with a respective layer of transformation to be applied to a target message, wherein the one or more transformations are identified by a reference that is maintained and delivered to a message queue to queue the message for sending to the message consumer, wherein the applying the one or more transformations to the message to obtain the transformed message applies each layer of transformation to the message and uses the reference to identify and apply the one or more transformations for the providing the transformed message to the message consumer.

15. The computer system of claim 12, wherein the method further comprises:

registering the message consumer and the service topology label with a service register that maintains a current service topology map of the service topology; and providing the received service topology label to the service register and receiving, in response, an indication from the service register that the message consumer is identified in the current service topology map and that the service topology label is not expired, wherein the determining that the message consumer is included in the service topology is based on the indication from the service register.

16. The computer system of claim 12, wherein the applying the one of more transformations comprises leveraging a transform driver to call to an external transformation service to perform at least one transformation of the one or more transformations, wherein the transform driver provides a transformation template repository with template transformations of which the call to the external transformation service is a part.

17. A computer program product comprising:

a computer readable storage medium readable by a processing circuit and storing instructions for execution by the processing circuit for performing a method comprising:

authenticating, in a message-oriented middleware environment, a message consumer for access to messages of a publisher;

receiving from the message consumer a service topology label identifying a service topology of a service of which the message consumer is a part, wherein the message consumer is a member of the service topology, and wherein the service topology label is used in controlling provision of messages to members of the service topology;

identifying an authority label for the message consumer, the authority label being associated with one or more transformations to apply to messages sent by the publisher; and based on obtaining a message from the publisher for publishing to message consumers that are members of the service topology:

determining that the message consumer is a member of the service topology;

identifying the one or more transformations based on the identified authority label for the message consumer;

applying, to the message from the publisher, the one or more transformations to obtain a transformed message, wherein the message from the publisher is an original message and wherein the transformed message is a variant of the original message and is transformed from the original message by the applying the one or more transformations; and providing the transformed message to the message consumer.

18. The computer program product of claim 17, wherein the service topology label has associated therewith a time-based expiration after which the service topology label is ineffective at establishing membership of the message consumer in the service topology.

19. The computer program product of claim 17, wherein the one or more transformations associated with the authority label are dictated by a collection of one or more template transform functions, each template function of the one or more template transform functions being associated with a respective layer of transformation to be applied to a target message, wherein the one or more transformations are identified by a reference that is maintained and delivered to a message queue to queue the message for sending to the message consumer, wherein the applying the one or more transformations to the message to obtain the transformed message applies each layer of transformation to the message and uses the reference to identify and apply the one or more transformations for the providing the transformed message to the message consumer.

20. The computer program product of claim 17, wherein the method further comprises:

registering the message consumer and the service topology label with a service register that maintains a current service topology map of the service topology; and providing the received service topology label to the service register and receiving, in response, an indication from the service register that the message consumer is identified in the current service topology map and that the service topology label is not expired, wherein the determining that the message consumer is included in the service topology is based on the indication from the service register.

* * * * *